UNITED STATES PATENT OFFICE.

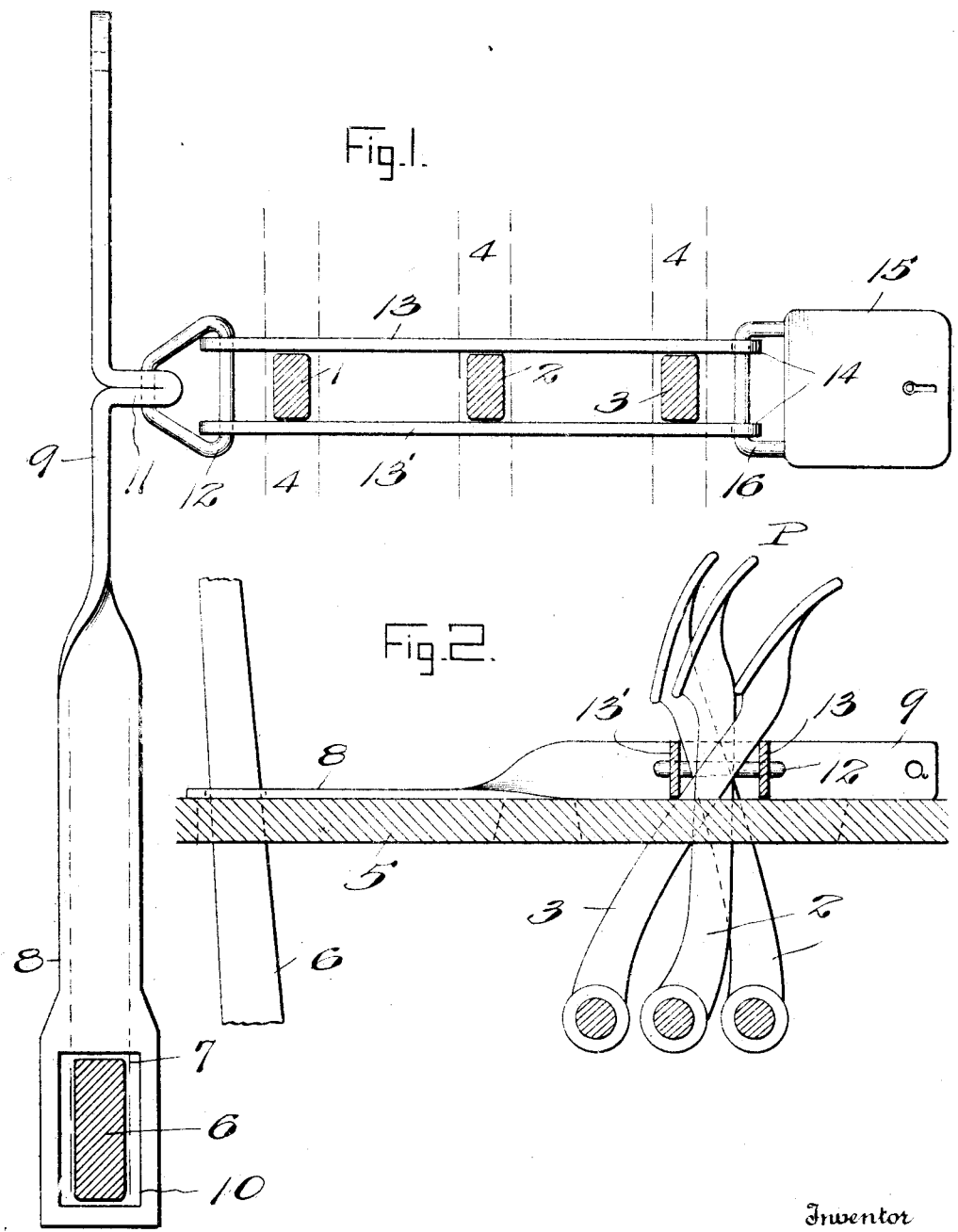

JOSEPH S. CAMPBELL, OF OGDEN, UTAH.

LEVER-LOCK.

1,382,169.  Specification of Letters Patent.  Patented June 21, 1921.

Application filed December 7, 1920. Serial No. 428,960.

*To all whom it may concern:*

Be it known that I, JOSEPH S. CAMPBELL, a citizen of the United States, residing at Ogden, county of Weber, and State of Utah, have invented a new and useful Lever-Lock, of which the following is a specification.

My invention relates particularly to devices of this character for use in connection with automobiles for the purpose of locking the control pedals against unauthorized or surreptitious manipulation, thus preventing operation of the automobile, and insuring the automobile against theft or unauthorized use.

The primary object of the invention is the provision of a simple, inexpensive, but effective means for locking the several pedals against movement, which may be applied with ease, and released with equal facility and despatch, and the invention consists in certain novel combinations and arrangements of parts as will be more specifically pointed out and claimed.

In the accompanying drawings I have illustrated one complete example of the physical embodiment of my invention, wherein the parts are combined and arranged according to the best mode I have thus far devised for the practical application of the principles of my invention.

Figure 1 is a plan view showing the device in locked position, the pedal shanks being indicated in section.

Fig. 2 is a sectional view transversely through the duplex hasps of the lock, showing their relation to the pedals and their shanks.

In the preferred form of the invention as illustrated in the drawings I have employed, for purposes of exemplification, the three control devices for a Ford car, the pedals being designated by the letter P; 1, the shank of the clutch pedal; 2, the shank of the reverse pedal; and 3, the shank of the brake pedal, which shanks are movable in the slots 4 indicated by dotted lines, in the foot board 5. The emergency brake or handle lever 6 is also shown, movable in the slot 7 (dotted lines) in the foot board 5.

The locking device includes an anchoring strap of metal composed of the two flat, angularly disposed portions 8 and 9 formed by twisting the strap at a suitable point, and the end of the portion 8 of the strap is fashioned with a slot 10 of sufficient size to be passed down over the brake handle or lever 6, and maintained in place on this lever. At a convenient location on the strap, a bend 11 is provided to form a perforated attaching lug for the loop or link 12 to which the duplex hasps 13 and 13′ are pivoted, and the free ends of these hasps are perforated as at 14 in order that they may be secured together by the padlock 15, whose shackle 16 is passed through the perforations when the hasps are locked in place.

The strap or anchoring member, in normal position, lies on the floor of the car and extends longitudinally thereof, being anchored in place on the hand lever 6, and the laterally disposed link or loop 12 is pivoted in the lug 11 to swing in a vertical plane with relation thereto. The duplex hasps 13 and 13′ are made up of flat metal straps with perforated ends, one end of each strap or hasp being permanently but loosely connected to the link, while the free ends of the duplex hasps, when not in locked position may be turned to suitable and convenient position, out of the way, yet accessible when required for use.

The utility and operation of the locking device will be apparent from the disclosure in the drawings, where the device is in locked position and holding securely the pedals against movement. The duplex hasps extend laterally from the anchoring strap, in parallel position, one at the front and one at the rear of the alined pedal shanks, along the floor or foot board of the car, and beneath the pedals P. The shackle 16 of the padlock 15 is passed through the perforated free ends of the hasps, and they are thus locked against separation, holding the several pedal shanks against individual movement. It will be noted that the group of pedals are shackled to the brake lever, and therefore the forward movement of the pedals will result in movement of the brake lever to operative position, thus retaining the four control members in joint locked position to insure against unauthorized manipulation of the control elements.

When the shackle of the padlock is released in usual manner, the former may be disengaged from the duplex hasps, and the hasps may then be turned to position parallel with the anchoring strap, where they will be out of the way for proper movement of the pedals while the car is in motion, or the duplex hasps may lie in position, transversely of the car, if preferred, as in this position and disconnected they do not interfere with the action of the pedals. When the hasps are released to permit operation of the car the brake lever also is released, as it will be apparent that the twisted anchoring strap, when disconnected from the locking pedals, may move freely with the lever if the brake is applied.

From the foregoing description taken in connection with my drawings it is apparent that I have provided a device which fulfils the conditions set forth as the purpose of my invention, and which performs its functions in a comparatively perfect manner.

Having thus fully described my invention, what I claim as new and desire to secure by Letters Patent is:—

1. The combination with an anchoring device having a slot and attached to an anchor, of a link pivoted to said device, a pair of hasps pivoted to said link and adapted to lie parallel at the front and rear of control devices, and means for joining and locking the free ends of said hasps.

2. The combination in a device as described with an anchoring strap having a slot and attached to an anchor, and a perforated lug on said strap, of a link pivoted in the lug a pair of hasps pivoted to said link and adapted to lie parallel at the front and rear of control devices, and a padlock having a shackle joining the free ends of said hasps.

JOSEPH S. CAMPBELL.